United States Patent
Roffman et al.

(10) Patent No.: US 6,179,420 B1
(45) Date of Patent: Jan. 30, 2001

(54) MULTIFOCAL OPHTHALMIC LENSES

(75) Inventors: Jeffrey H. Roffman; Timothy A. Clutterbuck, both of Jacksonville, FL (US); Richard J. Nason, Roanoke, VA (US); Timothy R. Poling, Jacksonville, FL (US); Michel Guillon, London (GB)

(73) Assignee: Johnson & Johnson Vision Products, Inc., Jacksonville, FL (US)

( * ) Notice: Under 35 U.S.C. 154(b), the term of this patent shall be extended for 0 days.

(21) Appl. No.: 09/296,061

(22) Filed: Apr. 21, 1999

(51) Int. Cl.[7] .................................................. G02C 7/04
(52) U.S. Cl. .............................................. 351/161; 351/177
(58) Field of Search .......................... 351/160 R, 160 H, 351/161, 162, 177

(56) References Cited

U.S. PATENT DOCUMENTS

| | | | |
|---|---|---|---|
| 4,890,913 | 1/1990 | De Carle | 351/161 |
| 5,002,382 | 3/1991 | Seidner | 351/161 |
| 5,024,517 | 6/1991 | Seidner | 351/161 |
| 5,125,729 | 6/1992 | Mercure | 351/161 |
| 5,484,312 | 1/1996 | Roffman et al. | 351/161 |
| 5,485,228 | 1/1996 | Roffman et al. | 351/161 |
| 5,574,518 | 11/1996 | Mercure | 351/161 |
| 5,835,192 | 11/1998 | Roffman et al. | 351/246 |

FOREIGN PATENT DOCUMENTS 0 201 231   11/1986   (EP) .
0 453 136   10/1991   (EP) .

*Primary Examiner*—Scott J. Sugarman
(74) *Attorney, Agent, or Firm*—Lois Gianneschi

(57) ABSTRACT

The invention provides a pair of multifocal lenses for the correction of presbyopia. The dominant eye lens has an optic zone with the distance optical power required and additional zones of either or both distance and near optical power. The non-dominant eye lens has an optic zone with the near optical power and additional zones of either or both near and distance optical power.

12 Claims, 1 Drawing Sheet

MULTIFOCAL OPHTHALMIC LENSES

FIELD OF THE INVENTION

The invention relates to ophthalmic lenses. In particular, the invention provides lenses that use more than one optical power, or focal length, and are useful in the correction of presbyopia.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is totally absent.

Among the methods used to correct for the eye's failure to accommodate is the mono-vision system in which a person is fitted with one contact lens for distance vision and one lens for near vision. The mono-vision system permits the wearer to distinguish both distance and near objects, but is disadvantageous in that a substantial loss in depth perception results. Thus, a need exists for lenses that both provide correction for the wearer's inability to accommodate and that overcomes some of the disadvantages of known lenses.

DETAILED DESCRIPTION OF THE INVENTION AND PREFERRED EMBODIMENTS

Figure 1A:
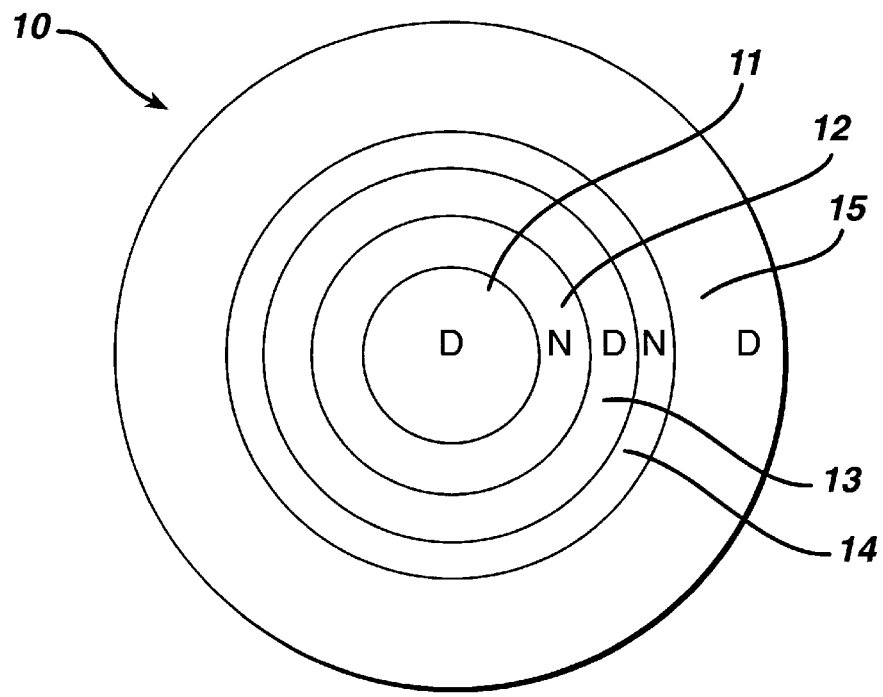
FIGS. 1a and 1b illustrate plan views of a pair of lenses of the invention.

The invention provides methods for correcting the lack of ability to accommodate, lenses for such correction, and methods for producing the lenses of the invention. The lenses of the invention utilize the fact that one of the wearer's eyes is predominant for distance vision to provide lenses that deliver superior distance and near vision. More specifically, the invention provides the dominant eye with a central distance vision zone and the non-dominant eye with a central near vision zone. The dominant eye lens additionally has near vision power and the non-dominant eye lens has distance power. Because both lenses have distance and near power, no substantial loss in depth perception results from use of the lenses.

In one embodiment, the invention comprises, consists essentially of, and consists of, a first and a second ophthalmic lens for a lens wearer: a.) the first lens comprising, consisting essentially of, and consisting of a convex and a concave surface, the convex surface comprising, consisting essentially of, and consisting of an optic zone comprising, consisting essentially of, and consisting of substantially all of the distance optical power and the concave surface comprising, consisting essentially of, and consisting of an optic zone of at least two concentric, annular portions, the power of each of the at least two annular portions substantially equal to that of the distance optical power, and b.) the second lens comprising, consisting essentially of, and consisting of a convex and a concave surface, the convex surface comprising, consisting essentially of, and consisting of an optic zone comprising, consisting essentially of, and consisting of substantially all of the near optical power and the concave surface comprising, consisting essentially of, and consisting of an optic zone of at least two concentric, annular portions, the power of each of the at least two annular portions substantially equal to that of the near optical power.

By "ophthalmic lens" is meant a contact, intraocular lens, or the like, or combinations thereof. Preferably, the lenses of the invention are contact lenses. By "distance optical power" is meant the amount of refractive power required to correct the wearer's distance vision acuity to the desired degree. By "near optical power" is meant the amount of refractive power required to correct the wearer's near vision acuity to the desired degree.

The method of the invention provides the wearer with a pair of ophthalmic lenses, one lens to be worn in the dominant eye and one to be worn in the non-dominant eye. By "dominant eye" is meant the eye that predominates for distance vision. The lens worn by the dominant eye has a convex surface with a central optic zone with the desired distance optical power. The concave surface has at least two concentric annular zones in its optic zone. The power of each of the at least two annular zones is substantially equal to that of the distance optical power. Either or both the convex and concave surfaces may have additional annular zones with distance optical power, near optical power, or combinations thereof. Preferably, the convex surface has only the central optical zone and no annular zones, the concave surface in this embodiment having at least two annular zones of either or both distance and near optical power. More preferably, the convex surface has only a central optical zone having the distance optical power, the concave surface having at least two zones of the distance optical power and one or more annular zones of near optical power.

For the lenses of the invention, in those embodiments in which both distance and near optical power annular zones are used, the distance annular zones preferably alternate with the near annular zones. No annular zone of intermediate power, or power between that of the near and distance power, is provided on either lens of the lens pair of the invention.

In those case in which both near and distance power annular zones are used in the lens for the dominant eye, the ratio of the lens' optic zone area devoted to the distance and near optical powers must be such that more area is devoted to the distance power. For the lens of the non-dominant eye, more lens area will be devoted to the near vision power. The preferred areas, on a percentage basis, for both the dominant and non-dominant eye lenses are disclosed in U.S. Pat. Nos. 5,835,192, 5,485,228, and 5,448,312, incorporated herein in their entireties by reference.

In the invention, the lens worn by the non-dominant eye has a convex surface with a central optic zone with the desired near optical power. The concave surface has at least two concentric annular zones in its optic zone. The power of each of the at least two annular zones is substantially equal to that of the near optical power. Either or both the convex and concave surfaces may have additional annular zones with distance optical power, near optical power, or combinations thereof Preferably, the convex surface has only the central optical zone and no annular zones, the concave surface in this embodiment having at least two annular zones of either or both distance and near optical power. More preferably, the convex surface has only a central optical zone having the near optical power, the concave surface having at least two zones of the near optical power and one or more annular zones of distance optical power.

In the lenses of the invention, the distance and near optical powers are spherical powers. Additionally, the distance and near optical power zones may be of any desired and practicable dimensions.

Figure 1B:
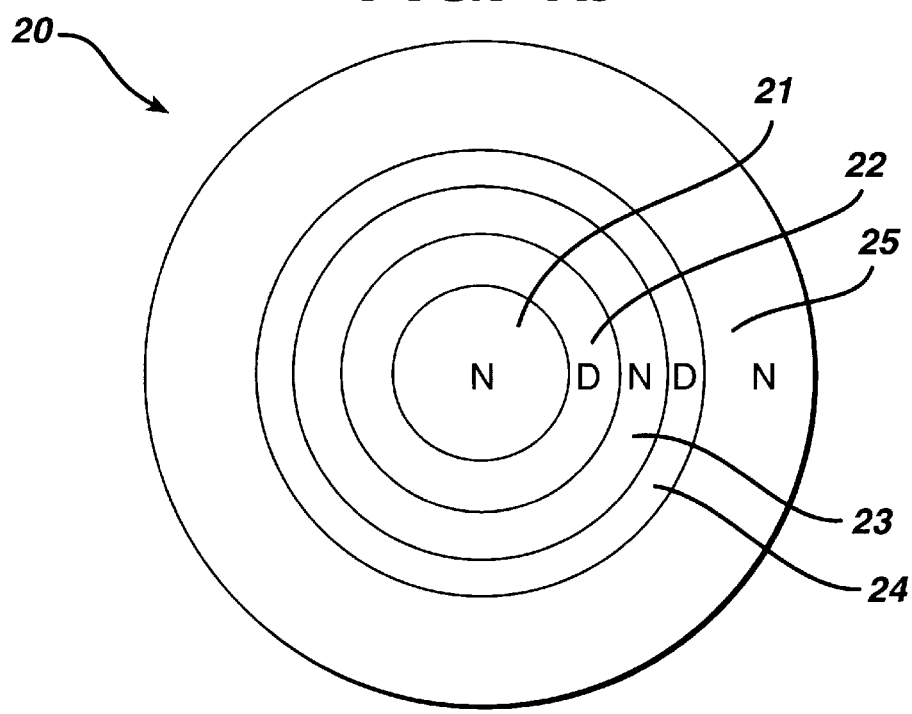

Referring to FIG. 1a, a lens 10 for a dominant eye is shown. As depicted, there appears central annular zone 11 of a distance optical power, and alternating distance and near optical power annular zones 12–15 thereafter. FIG. 1b depicts lens 20 for the non-dominant eye having a central near optical power annular zone 21 and alternating distance and near power zones 22–25 thereafter.

Contact lenses useful in the invention may be either hard or soft lenses. Soft contact lenses, made of any material suitable for producing such lenses, preferably are used. The lenses of the invention may have any of a variety of corrective optical characteristics incorporated onto the surfaces in addition to distance and near optical powers, such as, for example, cylinder power.

The lenses of the invention may be formed by any conventional method. For example, the annular zones formed therein may produced by diamond-turning using alternating radii. The zones may be diamond-turned into the molds that are used to form the lens of the invention. Subsequently, a suitable liquid resin is placed between the molds followed by compression and curing of the resin to form the lenses of the invention. Alternatively, the zones may be diamond-turned into lens buttons.

What is claimed is:

1. A first and a second ophthalmic lens for a lens wearer, the first lens comprising a convex and a concave surface each having an optic zone, the convex surface optic zone comprising a central annular zone comprising substantially all of the distance optical power and the concave surface optic zone comprising at least two concentric, annular portions, the power of each of the at least two annular portions substantially equal to that of the distance optical power, and the second lens comprising a convex and a concave surface each having an optic zone, the convex surface optic zone comprising a central annular zone comprising substantially all of the near optical power and the concave surface optic zone comprising at least two concentric, annular portions, the power of each of the at least two annular portions substantially equal to that of the near optical power.

2. The lens of claim 1, wherein either or both the convex and concave surfaces of the first lens, second lens, or both lenses comprise additional annular zones with distance optical power, near optical power, or combinations thereof.

3. The lens of claim 1, wherein the convex surfaces of the first and second lens consist essentially of the optic zones and the concave surfaces of the lenses comprise at least two annular zones of distance optical power, near optical power, or combinations thereof.

4. The lens of claim 3, wherein the concave surface of the first lens comprises at least two zones of the distance optical power and one or more annular zones of the near optical power and the concave surface of the second lens comprises at least two zones of the near optical power and one or more annular zones of the distance optical power.

5. A first and a second contact lens for a lens wearer the first lens comprising a convex and a concave surface each having an optic zone, the convex surface optic zone comprising a central annular zone comprising substantially all of the distance optical power and the concave surface optic zone comprising at least two concentric, annular portions, the power of the at least two annular portions substantially equal to that of distance optical power, and the second lens comprising a convex and a concave surface each having an optic zone, the convex surface optic zone comprising a central annular zone comprising substantially all of the near optical power and the concave surface optic zone comprising at least two concentric, annular portions, the power of the at least two annular portions substantially equal to that of the near optical power.

6. The lens of claim 5, wherein either or both the convex and concave surfaces of the first lens, second lens, or both lenses comprise additional annular zones with distance optical power, near optical power, or combinations thereof.

7. The lens of claim 5, wherein the convex surfaces of the first and second lens consist essentially of the optic zones and the concave surfaces comprise at least two annular zones of distance optical power, near optical power, or combinations thereof.

8. The lens of claim 7, wherein the concave surface of the first lens comprises at least two zones of the distance optical power and one or more annular zones of the near optical power and the concave surface of the second lens comprises at least two zones of the near optical power and one or more annular zones of the distance optical power.

9. A method for correcting presbyopia comprising the step of:

providing a contact lens pair, the first lens of the lens pair comprising a convex and a concave surface each having an optic zone, the convex surface optic zone comprising a central annular zone comprising substantially all of the distance optical power and the concave surface optic zone comprising at least two concentric, annular portions, the power of each of the at least two annular portions substantially equal to that of the distance optical power, and the second lens of the lens pair comprising a convex and a concave surface each having an optic zone, the convex surface optic zone comprising a central annular zone comprising substantially all of the near optical power and the concave surface optic zone comprising at least two concentric, annular portions, the power of each of the at least two annular portions substantially equal to that of the near optical power.

10. The method of claim 9, wherein either or both the convex and concave surfaces of the first lens, second lens, or both lenses comprise additional annular zones with distance optical power, near optical power, or combinations thereof.

11. The method of claim 9, wherein the convex surfaces of the first and second lens consist essentially of the optic zones and the concave surfaces of the lenses comprise at least two annular zones of distance optical power, near optical power, or combinations thereof.

12. The method of claim 11, wherein the concave surface of the first lens comprises at least two zones of the distance optical power and one or more annular zones of the near optical power and the concave surface of the second lens comprises at least two zones of the near optical power and one or more annular zones of the distance optical power.

* * * * *